W. C. HIGGINS.
Soap-Dish for Iron-Sinks.
No. 208,094. Patented Sept. 17, 1878.
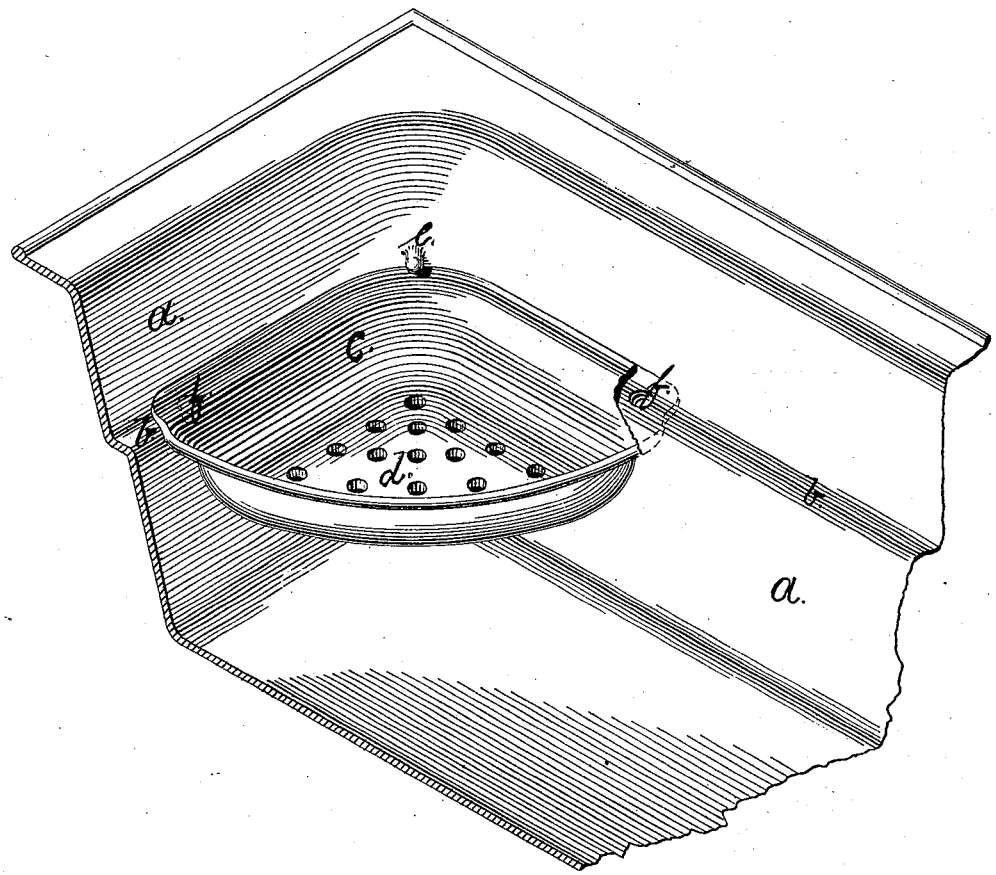
WITNESSES:
INVENTOR:

UNITED STATES PATENT OFFICE.

WERTER C. HIGGINS, OF NORWICH, CONNECTICUT.

IMPROVEMENT IN SOAP-DISHES FOR IRON SINKS.

Specification forming part of Letters Patent No. 208,094, dated September 17, 1878; application filed June 14, 1878.

*To all whom it may concern:*

Be it known that I, WERTER C. HIGGINS, of Norwich, in the county of New London and State of Connecticut, have invented a new and useful Improvement in Sinks; and I do hereby declare that the following is a full, clear, and exact description of the same, reference being had to the accompanying drawings, forming part of this specification.

This invention has reference to an improvement in iron sinks used in kitchens and other places to wash and cleanse table and cooking utensils; and consists in the peculiar and novel arrangement of a soap dish or tray with a sink, that may be readily and firmly secured in a corner of the sink, and as readily removed, as will be more fully set forth hereinafter, and pointed out in the claim.

The drawing represents one corner of a sink, the rest being shown broken off, and placed into the corner a soap dish or tray is shown, being held in place by two pins cast on the dish, arranged to enter holes in the sides of the sink, one of which, on the right-hand corner, being shown, and a portion of the dish being shown broken away, to show the hole underneath. In the corner a projection is cast in or secured to the sink to prevent tipping of the dish.

In the drawings, *a* is the side of the sink; *b*, a projection usually cast in the side of a sink.

*c* is a tray or soap-dish; *d*, the perforated bottom of the same. *e* is the corner projection, cast onto or secured to the sink in one or more corners. *f* are holes or depressions, into which pins cast on the tray or dish fit and firmly secure the same.

By slightly raising the dish or tray it can be removed, and in sinks where the projection *b* is made in the sides, by making the pin *e* slightly hook-shaped, so that the lip of the dish or tray can pass under the hook, the holes and pins *f* may be dispensed with.

A soap dish or tray that can be readily secured or removed forms a valuable addition to a sink and a convenient place for soap, keeping the same dry and saving the soap. As this dish can be readily removed it does not interfere with the use of the sink when the whole is required for use.

Having thus described my invention, I claim as new and desire to secure by Letters Patent—

The combination, with a sink, of the pin or hook *e* and dish or shelf *c*, arranged to secure the same within the sink with or without the holes and pins *f*, substantially as and for the purpose set forth.

WERTER C. HIGGINS.

Witnesses:
A. J. HAMMETT,
OLIVER T. FORBES.